US012792264B2

(12) United States Patent
Lu

(10) Patent No.: US 12,792,264 B2
(45) Date of Patent: Nov. 10, 2026

(54) MEMORY CONTROLLER AND OPERATION METHOD THEREOF, MEMORY SYSTEM AND ELECTRONIC DEVICE

(71) Applicant: Yangtze Memory Technologies Co., Ltd., Wuhan (CN)

(72) Inventor: Zhenran Lu, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 28 days.

(21) Appl. No.: 18/090,572

(22) Filed: Dec. 29, 2022

(65) Prior Publication Data

US 2024/0160385 A1 May 16, 2024

(30) Foreign Application Priority Data

Nov. 16, 2022 (CN) ......................... 202211434774.6

(51) Int. Cl.
*G06F 3/06* (2006.01)
*G06F 12/02* (2006.01)

(52) U.S. Cl.
CPC ............ *G06F 3/0659* (2013.01); *G06F 3/064* (2013.01); *G06F 3/0652* (2013.01); *G06F 12/0253* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2007/0277005 A1* | 11/2007 | So | G06F 12/0891 | 711/E12.017 |
| 2009/0172247 A1* | 7/2009 | Bar-Or | G11C 16/10 | 711/E12.008 |
| 2009/0257284 A1* | 10/2009 | Roohparvar | G11C 16/102 | 711/E12.001 |
| 2014/0056073 A1* | 2/2014 | Um | G11C 16/26 | 365/185.12 |
| 2014/0355347 A1* | 12/2014 | Shur | G11C 16/0483 | 365/185.11 |
| 2015/0370493 A1* | 12/2015 | Choi | G06F 3/0659 | 711/103 |
| 2015/0370701 A1* | 12/2015 | Higgins | G06F 12/0246 | 711/103 |
| 2016/0313943 A1* | 10/2016 | Hashimoto | G06F 16/1847 | |
| 2018/0144802 A1* | 5/2018 | Choi | G11C 16/0483 | |
| 2019/0317688 A1* | 10/2019 | Cheon | G06F 3/0608 | |
| 2020/0257621 A1* | 8/2020 | Pletka | G06F 12/0253 | |
| 2021/0055878 A1* | 2/2021 | Iwasaki | G06F 3/0608 | |
| 2021/0132803 A1* | 5/2021 | Hong | G06F 12/0238 | |
| 2022/0004338 A1* | 1/2022 | Lee | G06F 1/324 | |
| 2022/0100650 A1* | 3/2022 | Lai | G06F 12/0253 | |

* cited by examiner

*Primary Examiner* — Jared I Rutz
*Assistant Examiner* — Elias Young Kim
(74) *Attorney, Agent, or Firm* — Oblon, McClelland, Maier & Neustadt, L.L.P.

(57) ABSTRACT

Implementations of the present disclosure disclose a memory controller and an operation method thereof, a memory system and an electronic device. The memory controller is coupled to a memory. The operation method can include erasing at least one memory block in the memory before receiving a write command, adding the erased memory blocks into an idle block queue, and performing data writing on the memory blocks in the idle block queue after receiving the write command.

8 Claims, 4 Drawing Sheets

MEMORY CONTROLLER AND OPERATION METHOD THEREOF, MEMORY SYSTEM AND ELECTRONIC DEVICE

INCORPORATION BY REFERENCE

This present application claims the benefit of Chinese Patent Application No. 202211434774.6, filed on Nov. 16, 2022, which is incorporated herein by reference in its entirety.

BACKGROUND OF THE INVENTION

Field of the Invention

Implementations of the present disclosure relate to the field of integrated circuits, and in particular to a memory controller and an operation method thereof, a memory system and an electronic device.

Description of the Related Art

A semiconductor memory may include a volatile memory and a nonvolatile memory. The nonvolatile memory may include a flash memory, an erasable programmable read-only memory (EPROM), and a ferroelectric RAM (FRAM), etc. The flash memory is a low-cost, high-density, nonvolatile solid-state storage medium that is electrically erasable and reprogrammable. The flash memory may include a NOR flash memory and a NAND flash memory. Various operations, such as reading, programming (writing) and erasing, may be performed on the flash memory.

The development of flash memory has made great progress, but there is still relatively large room for improvement in the performance of the flash memory, especially in the performance of writing operation, etc.

SUMMARY OF THE INVENTION

A first aspect of the implementations of the present disclosure provide an operation method of a memory controller that is coupled to a memory. The operation method can include erasing at least one memory block in the memory before receiving a write command, adding the erased memory blocks into an idle block queue, and performing data writing on the memory blocks in the idle block queue after receiving the write command.

According to a second aspect of the implementations of the present disclosure, a memory controller is provided. The memory controller is coupled to a memory. The memory controller is configured to erase at least one memory block in the memory before receiving a write command, add the erased memory blocks into an idle block queue, and perform data writing on the memory blocks in the idle block queue after receiving the write command.

According to a third aspect of the implementations of the present disclosure, a memory system is provided that can include one or more memories and the memory controller as described above in the second aspect of the implementations of the present disclosure, which is coupled to the memory and configured to control the memory.

According to a fourth aspect of the implementations of the present disclosure, an electronic device is provided that can include the memory system as described in the second aspect of the implementations of the present disclosure.

In the implementations of the present disclosure, before a write command is received, at least one memory block in the memory is erased in advance, and the erased memory blocks are added into an idle block queue, and the memory blocks in the idle block queue are directly selected to write data after the write command is received, which can save at least part of the erasing time required to erase the memory blocks in write paths, reduce the time of the write paths, thereby being beneficial to improving the write speed.

In addition, when continuous write commands are received, at least one memory block in the idle block queue may be selected to write data, so as to reduce the number of erase operations, and then reduce the time required by the whole write paths, thereby being beneficial to further improving the write speed.

BRIEF DESCRIPTION OF THE DRAWINGS

Various implementations of this disclosure that are proposed as examples will be described in detail with reference to the following figures, wherein like numerals reference like elements, and wherein.

DETAILED DESCRIPTION OF THE PREFERRED IMPLEMENTATIONS

The technical solutions of the present disclosure will be further elaborated below in conjunction the figures and implementations. Although implementation methods of the present disclosure are shown in the figures, it should be understood that the present disclosure can be implemented in various forms and should not be limited by the implementations as set forth herein. Rather, these implementations are provided to more thoroughly understand the present disclosure, and to fully convey the scope of the present disclosure to those skilled in the art.

The present disclosure is more specifically described in the following paragraphs by way of example with reference to the figures. Advantages and features of the present disclosure will be more apparent from the following description and claims. It should be noted that the figures are all in a very simplified form and not to an accurate scale, and are only used to conveniently and clearly assist in explaining the purpose of the implementations of the present disclosure.

In the implementations of the present disclosure, the terms “first”, “second”, “third” and the like are used to distinguish similar objects, and are not necessarily used to describe a specific sequence or precedence order.

It should be noted that the technical solutions as set forth in the implementations of the present disclosure may be combined at random in case of no conflict.

A NAND memory may include multiple memory planes, each memory plane comprises multiple memory blocks, each memory block may comprise multiple memory pages, and each memory page may comprise multiple memory cells, wherein the memory block is the minimum unit for performing an erase operation, and the memory page is the minimum unit for performing a programming or reading operation. Before writing data to the NAND memory, it is usually necessary to perform an erase operation on a memory block to ensure that data is accurately written to the NAND memory. Here, the erase operation may be performed on one memory block, or on a super block composed of multiple memory blocks.

Figure 1:
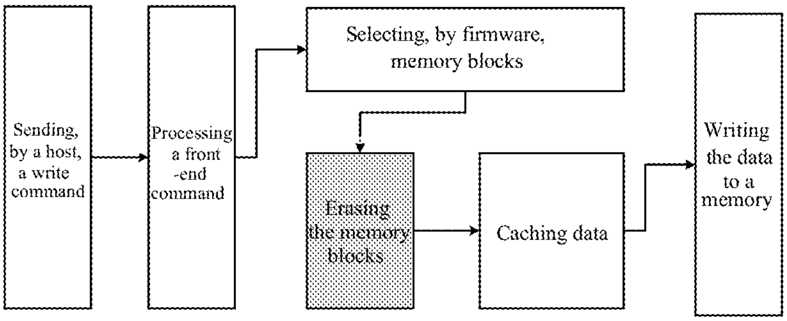
FIG. 1 is a flow diagram illustrating writing data to a memory according to an implementation.

FIG. 1 is a flow diagram illustrating writing data to a memory according to an implementation, which, as shown in FIG. 1, in a normal write path, comprises at least the following steps:

- Step 1: sending, by a host, a write command, for example, sending, by the host, a write command to a memory controller, the write command indicating to perform a writing operation on a memory, the memory controller being coupled to the memory;
- Step 2: processing a front-end command, for example, parsing, by the memory controller, an operation command sent by the host, and determining a type of the operation command sent by the host; in this example, the memory controller determining that the operation command sent by the host is the write command;
- Step 3: selecting memory blocks, and performing an erase operation on the selected memory blocks, for example, selecting, by firmware loaded in the memory controller, memory blocks, and erasing the memory blocks; and
- Step 4: writing cached data to the selected memory blocks, for example, writing, by the firmware, data to the selected memory blocks in sequence by taking the memory page as a unit, that is, writing data to the memory.

By performing the above steps 1 to step 4, the data sent by the host may be written to the memory. It should be noted that in the above write path, the host only sends a write command, while the memory controller actively performs an erase operation on the selected memory blocks according to actual situations of the selected memory blocks, so as to ensure that the data is accurately written to the memory.

Figure 2:
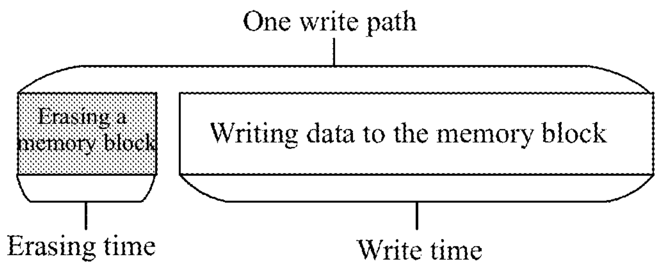
FIG. 2 is a timing diagram illustrating writing data to a memory according to an implementation.

However, after receiving the write command from the host and selecting the memory blocks, the selected memory blocks are required to be subjected to an erase operation and then a writing operation, that is, the writing operation can only proceed after the current memory block is erased. As shown in FIG. 2, one write path includes an erasing time required for erasing a memory block and a write time required for writing data to the memory block. Therefore, in the process of performing the write command, the time taken to erase memory blocks cannot be hidden in other operations, and the erasing time of each memory block is about 3 to 5 ms, resulting in relatively long time of the write path and no improvement in the performance of the writing operation.

Figure 5:
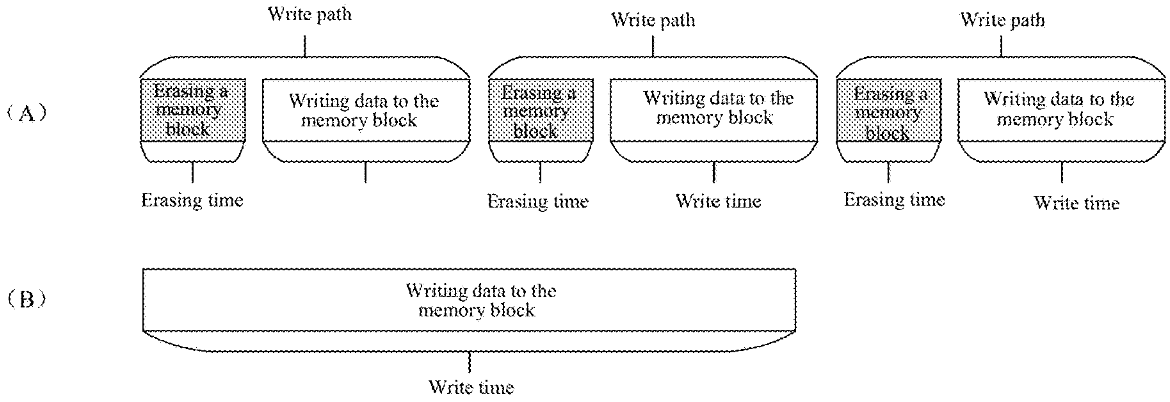
FIG. 5 is a schematic diagram illustrating two write paths according to implementations of the present disclosure.

In addition, when the host sends continuous write commands to the memory, as shown in (A) in FIG. 5, multiple erase operations are required to be performed, resulting in relatively long time of the whole write path and relatively slow write speed.

In view of this, an implementation of the present disclosure provides an operation method of a memory controller.

Figure 3:
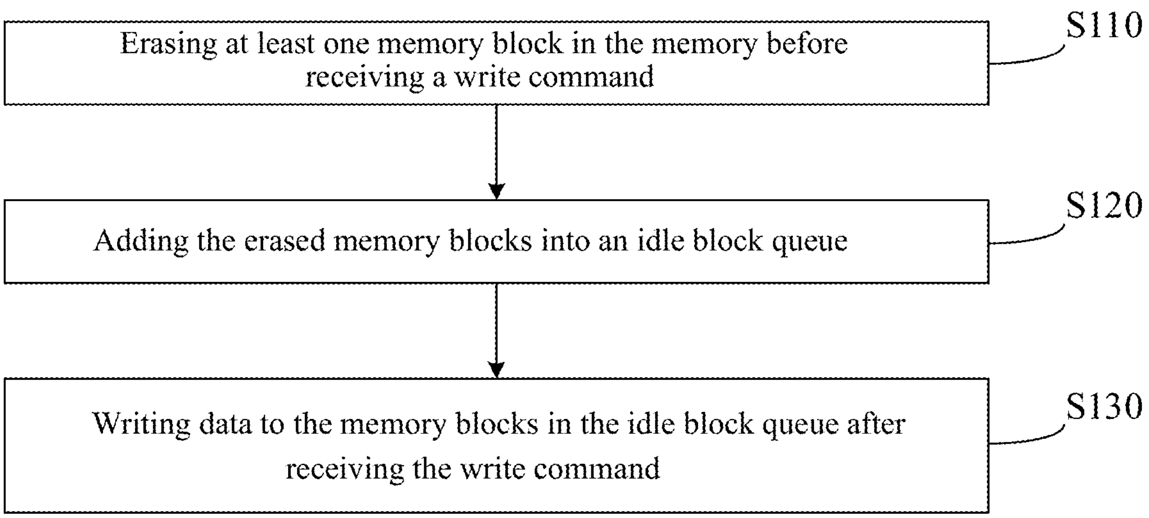
FIG. 3 is a flow diagram illustrating an operation method of a memory controller according to implementations of the present disclosure.

FIG. 3 is a flow diagram illustrating an operation method of a memory controller according to implementations of the present disclosure, the memory controller being coupled to a memory. Referring to FIG. 3, the operation method at least comprises the following steps:

- S110: erasing at least one memory block in the memory before receiving a write command;
- S120: adding the erased memory blocks into an idle block queue; and
- S130: performing data writing on the memory blocks in the idle block queue after receiving the write command.

The memory controller is coupled to the memory, and the memory controller may be configured to control operations of the memory, such as reading, erasing and writing operations, etc. The memory controller is also coupled to a host and communicates with the host, for example, writes data sent by the host to the memory in response to a write command of the host; or reads data stored in the memory to the host in response to a read command of the host.

In step S110, the memory controller may erase at least one memory block in the memory when the host is in an idle (that is, the host does not initiate an operation command) state; and the memory controller may also erase at least one memory block in the memory, for example, receive an erase command from the host before receiving a write command, when the host is in a busy state.

In step S120, the memory controller may create a new idle block queue, and add physical address information of the erased memory block into the idle block queue for use in the subsequent writing operation.

In step S130, after receiving the write command, in response to the write command, the memory controller may write at least part of data to the memory blocks in the idle block queue.

For example, when the size of the written data indicated by the write command is less than or equal to the capacity size of the memory blocks in the idle block queue, the memory blocks in the idle block queue can be directly selected to write data, and the selected memory blocks are not required to be erased, thus reducing the time of the write path.

For another example, when the size of the written data indicated by the write command is greater than the capacity size of the memory blocks in the idle block queue, at least part of data may first be written to the memory blocks in the idle block queue first, and then part of memory blocks outside the idle block queue may be selected for erasing, which can reduce the number of erased memory blocks, thus reducing the erasing time. Here, the write command may be a single write command or continuous write commands.

In the implementations of the present disclosure, before a write command is received, at least one memory block in the memory is erased in advance, and the erased memory blocks are added into an idle block queue, and the memory blocks in the idle block queue are directly selected to write data after the write command is received, which can save at least part of the erasing time required to erase the memory blocks in write paths, and reduce the time of the write paths, thereby being beneficial to improving the write speed.

In addition, when continuous write commands are received, at least one memory block in the idle block queue may be selected to write data, so as to reduce the number of erase operations, and in turn reduce the time required by the whole write path, thereby being beneficial to further improving the write speed.

Figure 4:
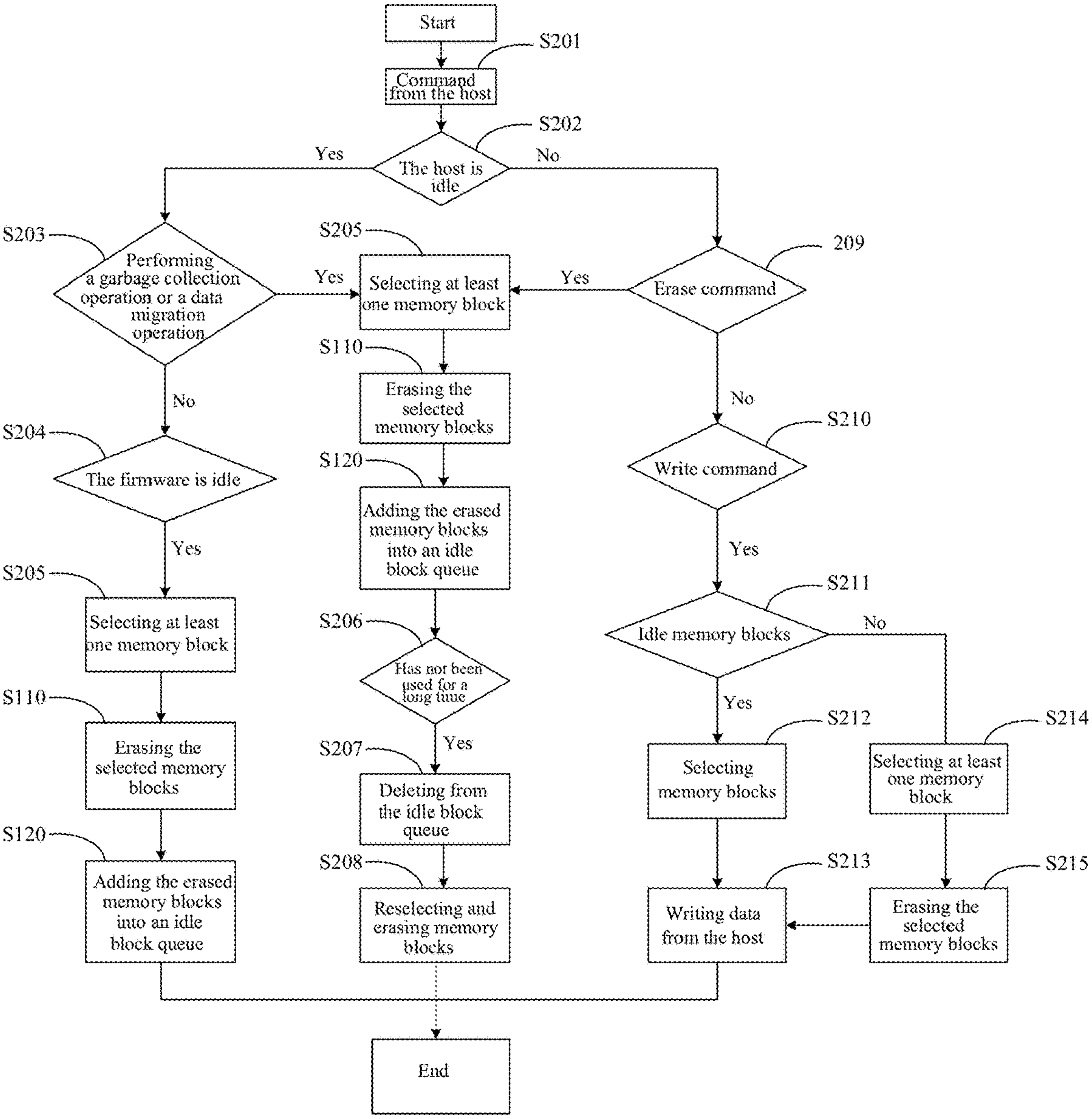
FIG. 4 is a schematic diagram illustrating an operation process of a memory controller according to implementations of the present disclosure.

FIG. 4 is a schematic diagram illustrating an operation process of a memory controller according to implementations of the present disclosure. The operation method of the memory controller provided by an implementation of the present disclosure will be described in detail below in conjunction with FIG. 4.

Referring to FIG. 4, in step S202: it is judged whether the host is idle or not.

Here, according to whether the memory controller receives a command from the host (that is, step S201), whether the host is idle or not may be judged; if so, that is, when the memory controller does not receive a command from the host, it is determined that the host is in an idle state, and step S203 is executed; otherwise, that is, when the memory controller receives a command from the host, it is determined that the host is in a busy state, and step S209 is executed.

Referring to FIG. 4, when it is determined that the host is in the idle state, step S203 is executed: judging whether the memory controller is performing a garbage collection operation or a data migration operation.

If the host is in the idle state, the memory controller can perform the garbage collection operation or the data migration operation on the memory to release more storage space. Here, the garbage collection operation or the data migration operation performed on the memory may be performed by the firmware loaded in the memory controller, and when powered on, the firmware is loaded on the memory controller to run. In one example, the firmware may be stored in the memory controller. In another example, the firmware may be stored in the memory.

The specific process of the garbage collection operation comprises: reading out data stored in a first memory block, rewriting the data to a second memory block, and then erasing the first memory block to release the first memory block. The specific process of data migration comprises: migrating the data stored in the first memory block and the data stored in the second memory block to a third memory block, and then erasing the first memory block and the second memory block to release the first memory block and the second memory block. Here, the first memory block, the second memory block and the third memory block represent different memory blocks in the memory.

It should be noted that the garbage collection operation or data migration operation is explained by taking the first memory block, the second memory block and the third memory block as examples in the above. In practical applications, the number of memory blocks for the garbage collection operation or data migration operation is not limited to this, and may be more.

Referring to FIG. 4, when it is determined that the memory controller is performing a garbage collection operation or a data migration operation, step S205 is executed: selecting at least one memory block.

Here, when the memory controller is performing the garbage collection operation, the firmware may select a memory block different from the second memory block, which may be the first memory block or other memory blocks; and when the memory controller is performing the data migration operation, the firmware may select a memory block different from the third memory block, which may be the first memory block, the second memory block or other memory blocks. In step S205, the number of the memory blocks selected by the firmware may be one or more, which is not particularly limited in the present disclosure.

In some implementations, the above step S110 comprises: erasing at least one memory block in the memory when performing the garbage collection operation or the data migration operation.

Referring to FIG. 4, when the garbage collection operation or the data migration operation is performed, the firmware may first select at least one memory block (that is, step S205), then erase the selected memory blocks (that is, step S110), and add the erased memory blocks to an idle block queue (that is, step S120).

For example, when the garbage collection operation is performed, the firmware selects a fourth memory block, erases the first memory block and the fourth memory block simultaneously after the data stored in the first memory block is written to the second memory block, and adds the erased first memory block and fourth memory block to the idle block queue for use in the subsequent writing operation. Here, the erasing of the fourth memory block can be hidden in the process of performing garbage collection, thus reducing the time of the write path and being beneficial to improving the write speed.

For another example, when the data migration operation is performed, the firmware selects the fourth memory block, erases the first memory block, the second memory block and the fourth memory block simultaneously after the data stored in the first memory block and the data stored in the second memory block are migrated to the third memory block, and adds the erased first memory block, second memory block and fourth memory block to the idle block queue for use in the subsequent writing operation. Here, the erasing of the fourth memory block can be hidden in the process of performing data migration, thus reducing the time of the write path and being beneficial to improving the write speed.

Here, the fourth memory block represents a memory block in the memory different from the first memory block, the second memory block and the third memory block. For example, the fourth memory block may be a memory block that has not been used for a long time in the memory. The fourth memory block may also be a memory block containing invalid data in the memory.

In the implementations of the present disclosure, by erasing at least one memory block in the process of performing the garbage collection or the data migration, the erasing of the memory block can be hidden in the process of the garbage collection or the data migration, thus reducing the time of the write path and being beneficial to improving the write speed.

In some implementations, the above garbage collection operation is a background garbage collection operation.

Garbage collection can include foreground garbage collection and background garbage collection. When the available storage space in the memory is less than the total amount of the written data, the memory controller needs to perform garbage collection on the memory to release enough storage space for data writing. At this time, garbage collection is passive, which is called foreground garbage collection. When the memory controller is in an idle state, the memory controller actively performs garbage collection on the memory to release more storage space. At this time, garbage collection is active, which is called background garbage collection.

In the implementations of the present disclosure, by erasing at least one memory block in the process of performing the background garbage collection, not only is the erasing of the memory block hidden in the process of the background garbage collection, but also the method provided by the implementation of the present disclosure can reduce the overhead of the firmware as compared with the method in which the erasing of the memory block is hidden in the foreground garbage collection.

Referring to FIG. 4, when it is determined that the memory controller is not performing the garbage collection operation or the data migration operation, step S204 is executed: judging whether the firmware is idle. If so, step S205 is executed: selecting at least one memory block.

Here, when the memory controller is not performing the garbage collection operation or the data migration operation, it is further determined whether the firmware is idle, that is, whether the memory controller is performing other operations, such as wear leveling, or bad block management, or the like. If the memory controller is not performing other operations, it is determined that the firmware is idle, and step S205 is executed; and if the memory controller is performing other operations, it is determined that the firmware is busy, and after the other operations are finished (that is, when the firmware is idle), step S205 is executed.

In some implementations, the above step S110 comprises: erasing at least one memory block in the memory when the memory controller is in an idle state.

Referring to FIG. 4, when the firmware is idle, the firmware may first select at least one memory block (that is, step S205), then erase the selected memory blocks (that is, step S110), and add the erased memory blocks into an idle block queue (that is, step S120) for use in the subsequent writing operation. Here, the erasing of the memory block can be hidden in the time when the firmware is idle, thus reducing the time of the write path and being beneficial to improving the write speed.

In some implementations, the selected memory block may be a memory block storing no valid data in the memory, so as to avoid the damage to the valid data.

In the implementation of the present disclosure, by erasing at least one memory block when the firmware is idle, not only is the erasing of the memory block hidden in the process during which the firmware is idle, but also the method provided by the implementation of the present disclosure can reduce the overhead of the firmware as compared with the method in which the erasing of the memory block is hidden in the process during which the firmware is busy.

Referring to FIG. 4, when it is determined that the host is busy, step S209 is executed: judging whether an erase command is received from the host, for example, judging a type of an operation command for the memory, and generating a judgment result; and performing the erase operation in response to the erase command when the judgment result indicates that the operation command is the erase command.

The memory controller communicates with the host through at least one of various interface protocols. After the host sends the operation command for the memory (that is, the host is in a busy state), the memory controller may parse the command received from the host to judge whether the erase command is received. Here, the types of operation command include: a read command, a write command or an erase command.

When a parsing result of the memory controller indicates that the command from the host is an erase command, an erase operation can be performed on the memory block indicated by the erase command. Here, the types of erase command include a Purge command or an Erase command. The Erase command is used to remove the mapping between a logical address and a physical address, so that the host can no longer read the erased data, and the erased data becomes invalid data. The Purge command is used to empty the garbage data or invalid data in the memory, thus releasing the storage space.

In some implementations, the above operation method further comprises: performing an erase operation on the memory according to the received erase command; the above step S110 comprises: when performing the erase operation, selecting at least one memory block in the memory, and performing the erase operation on the selected at least one memory block.

Referring to FIG. 4, when it is determined that the command from the host is an erase command, the firmware may first select at least one memory block (that is, step S205), then erase the selected memory blocks (that is, step S110), and add the erased memory blocks into an idle block queue (that is, step S120). Here, the memory blocks selected by the firmware may be memory blocks indicated by the erase command, and may further comprise other memory blocks. The number of the memory blocks selected by firmware is not particularly limited in the present disclosure.

In some implementations, a receiving moment of the erase command is earlier than that of the write command. Before the write command is received, at least one memory block is erased in advance according to the erase command, and the erased memory blocks are added into the idle block queue for use in the subsequent writing operation.

In other implementations, the receiving moment of the erase command is later than that of the write command. After a current write command is received, at least one memory block is erased according to the erase command, and the erased memory blocks are added to the idle block queue for use in the next writing operation when a next write command is received.

In the implementations of the present disclosure, by erasing at least one memory block in the process of performing the erase operation, the erasing of the memory block can be hidden in the process of the erase operation, and the receiving moment of the erase command is earlier than that of the write command, which is beneficial to ensuring that there are memory blocks available for use for write commands in the idle block queue, thus reducing the time of the write path and being beneficial to improving the write speed.

Referring to FIG. 4, when it is determined that the command from the host is not an erase command, step S210 is executed: judging whether the write command from the host is received, for example, judging a type of an operation command for the memory, and generating a judgment result; and performing a writing operation in response to the write command when the judgment result indicates that the operation command is the write command.

Referring to FIG. 4, when it is determined that the command from the host is a write command, step S211 is executed: judging whether there are idle memory blocks.

Here, the memory controller can invoke the idle block queue and determine whether there are idle memory blocks in the idle block queue; if so, that is, there are idle memory blocks in the idle block queue, step S212 is executed; otherwise, that is, there are no idle memory blocks in the idle block queue, step S214 is executed.

In some implementations, the above step S130 comprises: writing data to the memory blocks in the idle block queue in response to the write command when the judgment result indicates that the operation command is the write command.

Referring to FIG. 4, when it is determined that there are idle memory blocks in the idle block queue, the firmware directly selects the memory blocks in the idle block queue (that is, step S212), and writes the data from the host to the memory blocks in the idle block queue (that is, step S213), which can save the erasing time required to erase the memory blocks in the write path, and reduce the time of the write paths, thereby being beneficial to improving the write speed.

Referring to FIG. 4, when it is determined that there are no idle memory blocks in the idle block queue, at least one memory block is selected (that is, step S214); the selected memory blocks are erased (that is, step S215), and the data from the host is written to the erased memory blocks.

There are at least three situations where there are no idle memory blocks in the idle block queue, including: 1) before receiving a write command, a memory block is not erased in advance; 2) before receiving the write command, the memory block is erased in advance and added to the idle block queue, and the erased memory block that has not been used for a long time is deleted; 3) before receiving the write command, the memory block is erased in advance and added into the idle block queue, and the erased memory block is occupied by the last write command.

In some implementations, the above operation method also comprises: deleting the memory block from the idle block queue when a waiting duration of the memory block in the idle block queue is greater than a preset duration.

Referring to FIG. 4, after the erased memory block is added to the idle block queue, step S206 is executed: judging whether the memory block in the idle block queue has not been used for a long time. If so, step S207 is executed, that is, the memory block that has not been used for a long time is deleted from the idle block queue; otherwise, the memory block in the idle block queue continues to wait for the next write command.

The preset duration may be one week, one month, half a year, one year or longer, which can be flexibly selected by those skilled in the art according to actual needs, and will not be particularly limited in the present disclosure.

It should be noted that, in practical applications, if the memory block in the idle block queue has not been used for a long time, the memory block may fail due to garbage data or invalid data caused by interference, and if the data from the host is written to the memory block that has not been used for a long time, data loss or write errors may occur.

In the implementations of the present disclosure, when the waiting duration of the memory block in the idle block queue is greater than the preset duration, the memory block is deleted from the idle block queue, which is beneficial to improving the security and accuracy of the writing operation.

Referring to FIG. 4, after the memory block that has not been used for a long time is deleted from the idle block queue, step S208 is executed: reselecting and erasing a memory block.

Here, reselecting and erasing a memory block may be performed, with reference to the above, when the garbage collection operation or the data migration operation is performed, or may be performed when the firmware is idle, or may be performed when an erase command is received from the host, so as to ensure that a certain number of memory blocks in the idle block queue are available for use for the subsequent writing operation.

FIG. 5 is a schematic diagram illustrating two write paths according to implementations of the present disclosure, wherein (A) in FIG. 5 shows a schematic diagram of write paths in the prior art, and (B) in FIG. 5 shows a schematic diagram of write paths in a technical solution provided by implementations of the present disclosure. In connection with FIG. 5, regardless of a single write command or continuous write commands, after the write command is received, the operation method provided by the implementations of the present disclosure may directly write data to memory blocks in an idle block queue, which can save the erasing time required to erase the memory blocks in the write paths, and reduce time of the write paths, thereby being beneficial to improving the write speed.

Here, when the write commands from the host are not continuous, that is, there is an idle time between the previous write command and the next write command, the memory controller can erase at least one memory block during the idle time, and add the erased memory blocks to an idle block queue, so as to ensure that the memory blocks erased just now are continuously kept in the memory, which is beneficial to further improving the write performance of the memory.

Based on the operation method of the memory controller described above, an implementation of the present disclosure further provides a memory controller which is coupled to a memory and configured to: erase at least one memory block in the memory before receiving a write command; add the erased memory blocks to an idle block queue; and write data to the memory blocks in the idle block queue after receiving the write command.

In some implementations, the memory controller is further configured to: perform an erase operation on the memory according to a received erase command, wherein a receiving moment of the erase command is earlier than that of the write command;

The memory controller is specifically configured to: select at least one memory block in the memory when performing the erase operation, and perform the erase operation on the selected at least one memory block.

In some implementations, the memory controller is further configured to: judge a type of an operation command for the memory, and generate a judgment result; and perform the erase operation in response to an erase command when the judgment result indicates that the operation command is the erase command.

In some implementations, the memory controller is also specifically configured to: write data to the memory blocks in the idle block queue in response to a write command when the judgment result indicates that the operation command is the write command.

In some implementations, the memory controller is specifically configured to: erase at least one memory block in the memory when performing a garbage collection operation or a data migration operation. In some implementations, the garbage collection operation is a background garbage collection operation.

In some implementations, the memory controller is specifically configured to: erase at least one memory block in the memory when the memory controller is in an idle state.

In some implementations, it is characterized in that the memory controller is further configured to: delete the memory blocks from the idle block queue when a waiting duration of the memory block in the idle block queue is greater than a preset duration.

Based on the above memory controller, implementations of the present disclosure further provide a memory system.

Figure 6:
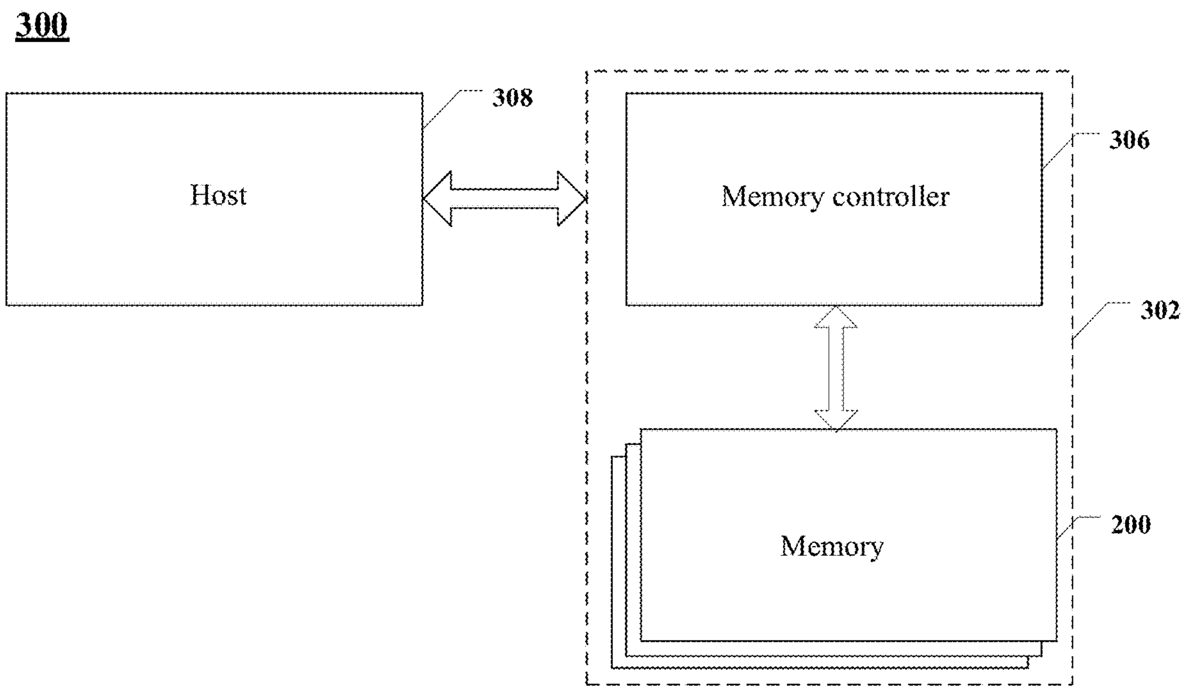
FIG. 6 is a schematic diagram illustrating a memory system according to implementations of the present disclosure.

FIG. 6 is a schematic diagram illustrating a memory system 300 according to implementations of the present disclosure. Referring to FIG. 6, the memory system 300 can include one or more memories 200, and a memory controller 306 coupled to the memory 200 and configured to control the memory 200.

The memory 300 may be a mobile phone, a desktop computer, a laptop computer, a tablet computer, a vehicle computer, a gaming console, a printer, a positioning device, a wearable electronic device, a smart sensor, a virtual reality (VR) device, an augmented reality (AR) device, or any other suitable electronic devices with a memory therein.

As shown in FIG. 6, the memory system 300 may include a host 308 and a memory subsystem 302. The memory subsystem 302 has one or more memories 200, and the memory subsystem further comprises a memory controller 306. The host 308 may be a processor (e.g., a central processing unit (CPU)) or a system-on-chip (SoC) (e.g., an application processor (AP)) of the electronic device. The host 308 may be configured to send data to the memory 200. Alternatively, the host 308 may be configured to receive data from the memory 200.

The memory 200 may be a NAND flash memory (e.g., three-dimensional (3D) NAND flash memory). The memory 200 may have a reduced leakage current from a driving transistor (e.g., a string driver) coupled to an unselected word line during the erase operation, which allows further size reduction of the driving transistor.

In some implementations, the memory controller 306 is further coupled to the host 308. The memory controller 306 may manage data stored in the memory 200 and communicate with the host 308.

In some implementations, the memory controller 306 is designed to operate in a low duty cycle environment, such as secure digital (SD) cards, compact flash (CF) cards, universal serial bus (USB) flash drives, or other media for use in electronic devices such as personal computers, digital cameras, mobile phones, etc.

In some implementations, the memory controller 306 is designed to operate in a high duty cycle environment, such as an solid state drive (SSD) or an embedded multimedia card (eMMC). The SSD or the eMMC functions as a data memory for mobile devices such as smartphones, tablet computers, laptop computers, etc. and as an enterprise memory array.

The memory controller 306 may be configured to control operations of the memory 200, such as reading, erasing and programming operations. The memory controller 306 may be further configured to manage various functions with respect to data stored or to be stored in the memory 200, including but not limited to, bad block management, garbage collection, logical to physical address translation, wear leveling, and the like. In some implementations, the memory controller 306 is further configured to process error correction codes (ECC) with respect to data read from or written to the memory 200.

The memory controller 306 may also perform any other suitable functions, such as formatting the memory 200. The memory controller 306 may communicate with external devices (e.g., the host 308) according to a particular communication protocol. For example, the memory controller 306 may communicate with external devices through at least one of various interface protocols, such as a USB protocol, an MMC protocol, a Peripheral Component Interconnect (PCI) protocol, a PCI-Express (PCI-E) protocol, an Advanced Technology Attachment (ATA) protocol, a Serial ATA protocol, a Parallel ATA protocol, a Small Computer Small Interface (SCSI) protocol, an Enhanced Small Disk Interface (ESDI) protocol, an Integrated Drive Electronics (IDE) protocol, a Firewire protocol, etc.

The memory controller 306 and the one or more memories 200 may be integrated into various types of storage devices, for example, being encompassed in the same package (e.g., a Universal Flash Storage (UFS) package or an eMMC package). That is, the memory system 300 may be implemented and packaged into different types of end electronic products.

Figure 7A:
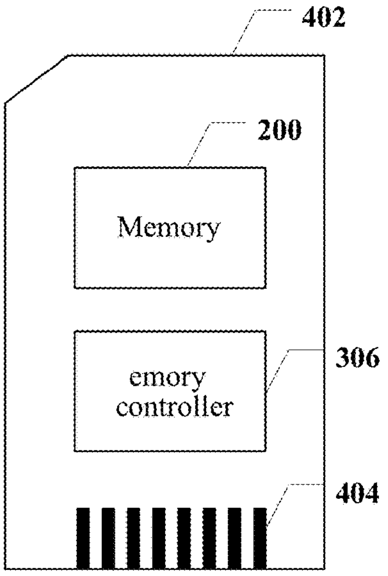
FIG. 7*a* is a schematic diagram illustrating a memory card according to implementations of the present disclosure.

In one example as shown in FIG. 7*a*, the memory controller 306 and a single memory 200 may be integrated into a memory card 402. The memory card 402 may include a PC card (PCMCIA, Personal Computer Memory Card International Association), a CF card, a smart media (SM) card, a memory stick, a multimedia card (MMC, RS-MMC, MMC-micro), an SD card (SD, mini SD, microSD, SDHC), UFS, etc. The memory card 402 may further include a memory card connector 404 that couples the memory card 402 with a host (e.g., the host 308 in FIG. 6).

Figure 7B:
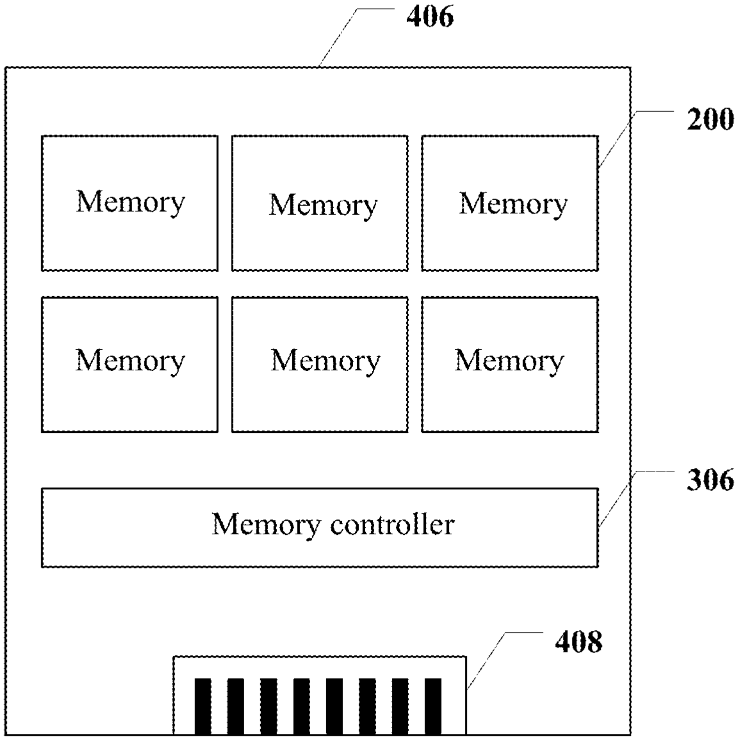
FIG. 7*b* is a schematic diagram illustrating a solid-state drive according to implementations of the present disclosure.

In another example as shown in FIG. 7*b*, the memory controller 306 and multiple memories 200 may be integrated into a solid-state drive (SSD) 406. The SSD 406 may further include an SSD connector 408 that couples the SSD 406 with a host (e.g., the host 308 in FIG. 6). In some implementations, the storage capacity and/or operating speed of the SSD 406 is greater than the storage capacity and/or operating speed of the memory card 402.

It can be understood that the memory controller 306 may perform the operation method provided by any of the implementations of the present disclosure.

An implementation of the present disclosure further provides an electronic device, including: the memory system in any of the above implementations. The electronic device includes a mobile phone, a desktop computer, a tablet computer, a laptop computer, a server, a vehicle-mounted device, a wearable device, or a mobile power supply, or the like.

The forgoing descriptions are only specific implementations of the present disclosure, but the scope of protection of the present disclosure is not limited thereto. Variations or replacements within the technical scope of the present disclosure may be readily conceived by any of those skilled in the art, which shall fall within the scope of protection of the present disclosure. Therefore, the scope of protection of the present disclosure should be defined only by the scope of protection of the claims.

The invention claimed is:

1. A method of operating a memory controller that is coupled to a memory, comprising:
- erasing at least one memory block in the memory before receiving a write command;
- adding the erased memory blocks into an idle block queue; and
- performing data writing on the memory blocks in the idle block queue after receiving the write command,
- wherein erasing the at least one memory block in the memory before receiving the write command further includes:
  - determining whether any commands are received;
  - determining that no commands are received;
  - performing a garbage collection operation on the memory upon determination that no commands are received, the garbage collection operation including erasing at least one first memory block and at least one second memory block simultaneously, during which data stored in the at least one first memory block is neither read out nor written to any memory block in the memory, and the at least one second memory block is to be erased after data stored in the at least one second memory block is read out and written to at least one third memory block in the memory;
  - determining that a command is received;

determining whether the command received is an erase command upon determination that the command is received, the erase command indicating at least one memory block to be erased;

determining that the command received is the erase command; and upon determination that the command received is the erase command, erasing a fourth memory block that is indicated by the erase command and a fifth memory block that is not indicated by the erase command, and adding the erased memory blocks into the idle block queue includes adding the erased at least one first memory block, the erased at least one second memory block, the erased fourth memory block, and the erased fifth memory block into the idle block queue.

2. The method of claim 1, wherein the garbage collection operation is a background garbage collection operation.

3. The method of claim 1, further comprising:

deleting the memory blocks from the idle block queue in response to a waiting duration of the memory blocks in the idle block queue being greater than a preset duration.

4. A memory controller that is coupled to a memory and that is configured to:

erase at least one first memory block in the memory before receiving a write command;

add the erased first memory blocks into an idle block queue; and perform data writing on the memory blocks in the idle block queue after receiving the write command, wherein the memory controller erases the at least one memory block in the memory before receiving the write command by:

determining whether any commands are received;

performing a garbage collection operation on the memory upon determination that no commands are received, the garbage collection operation including erasing at least one first memory block and at least one second memory block simultaneously, during which data stored in the at least one first memory block is neither read out nor written to any memory block in the memory, and the at least one second memory block is to be erased after data stored in the at least one second memory block is read out and written to at least one third memory block in the memory;

determining whether a command received is an erase command upon determination that the command is received, the erase command indicating at least one memory block to be erased; and upon determination that the command received is the erase command, erasing a fourth memory block and a fifth memory block that is not indicated by the erase command, and the memory controller adds the erased memory blocks into the idle block queue by adding the erased at least one first memory block, the erased at least one second memory block, the erased fourth memory block, and the erased fifth memory block into the idle block queue.

5. The memory controller of claim 4, wherein the garbage collection operation is a background garbage collection operation.

6. The memory controller of claim 4 that is further configured to:

delete the memory blocks from the idle block queue in response to a waiting duration of the memory blocks in the idle block queue being greater than a preset duration.

7. A memory system, comprising:

one or more memories; and a memory controller that is coupled to the one or more memories and that is configured to:

erase at least one first memory block in the memory before receiving a write command;

add the erased first memory blocks into an idle block queue; and perform data writing on the memory blocks in the idle block queue after receiving the write command, wherein the memory controller erases the at least one memory block in the memory before receiving the write command by:

determining whether any commands are received;

performing a garbage collection operation or a data migration operation on the memory upon determination that no commands are received, the garbage collection operation including erasing at least one first memory block and at least one second memory block simultaneously, during which data stored in the at least one first memory block is neither read out nor written to any memory block in the memory, and the at least one second memory block is to be erased after data stored in the at least one second memory block is read out and written to at least one third memory block in the memory;

determining whether a command received is an erase command upon determination that the command is received, the erase command indicating at least one memory block to be erased; and upon determination that the command received is the erase command, erasing a fourth memory block and a fifth memory block that is not indicated by the erase command, and the memory controller adds the erased memory blocks into the idle block queue by adding the erased at least one first memory block, the erased at least one second memory block, the erased fourth memory block, and the erased fifth memory block into the idle block queue.

8. An electronic device comprising the memory system of claim 7.

* * * * *